United States Patent [19]
Sherlock et al.

[11] Patent Number: 6,157,977
[45] Date of Patent: Dec. 5, 2000

[54] BUS BRIDGE AND METHOD FOR ORDERING READ AND WRITE OPERATIONS IN A WRITE POSTING SYSTEM

[75] Inventors: Derek A Sherlock; Thomas V Spencer, both of Ft Collins, Colo.; Francisco Corella, Sacramento, Calif.

[73] Assignee: Hewlett Packard Company, Palo Alto, Calif.

[21] Appl. No.: 09/198,833

[22] Filed: Nov. 24, 1998

[51] Int. Cl.[7] .............................. G06F 13/00; G06F 12/00
[52] U.S. Cl. ......................... 710/129; 710/128; 711/141; 370/402
[58] Field of Search ...................... 710/128, 129, 710/263, 101, 112, 107, 100, 2, 57, 49, 52, 21; 711/118, 141, 143, 154; 712/224; 370/401, 402, 911; 714/50; 709/213, 217, 235, 238, 250; 365/189.04

[56] References Cited

U.S. PATENT DOCUMENTS 5,613,075  3/1997  Wade et al. .
5,870,567  2/1999  Hausauer et al. .
5,881,253  3/1999  Seeman .
5,918,069  6/1999  Matoba .

*Primary Examiner*—Gopal C. Ray

[57] ABSTRACT

A bus bridge is disclosed that provides an interface between two computer buses and guarantees the proper ordering of write operations mastered from one bus relative to read operations mastered from the other bus where the presence of write posting storage in the bus bridge could cause ordering violations. The bus bridge includes a first mechanism for counting the number of write operations that are received by the bus bridge and queued in the write posting storage. In addition, the bus bridge includes a second mechanism for counting the number of write operations completed on the second bus. A mechanism for measuring the age of data held in each cache line of a coherent cache is also included as part of the bus bridge. Finally, the bus bridge includes a mechanism for delaying the completion of a read operation from the cache until all writes that were accepted by the bus bridge on the first bus before the cache data was fetched have been completed on the second bus. This is determined by comparing the age of the data held in a cache line to be read with the difference between the number of write operations received by the bus bridge and the number of write operations that have completed on the second bus.

18 Claims, 3 Drawing Sheets

BUS BRIDGE AND METHOD FOR ORDERING READ AND WRITE OPERATIONS IN A WRITE POSTING SYSTEM

BACKGROUND OF THE INVENTION

The present invention relates generally to the field of input/output (I/O) device control in a computer system and, more particularly, to the ordering of read return data relative to write data passing through a bus bridge between two computer buses where the presence of write posting storage in the bus bridge would otherwise cause ordering violations.

In a computer system, it is often desirable that direct memory access (DMA) reads by an I/O device use some form of prefetching so that memory access latency can be masked. As a result, I/O buses can be used more efficiently. It is critical, however, for the prefetching to be coherent to ensure that prefetched data supplied to DMA devices reflect the latest memory writes by processors, other I/O devices, or bus bridges. The coherent prefetch buffer can be thought of as a cache as it participates in the system's coherency protocol along with any other devices, such as central processing units (CPUs). Inasmuch as the prefetch cache is coherent, the completion of DMA traffic to the prefetch cache is equivalent, in terms of ordering and coherency, to completion to memory.

Writes by a CPU to an I/O device, also known as programmed I/O (PIO), can occur directly in a connected manner or through a posted write first-in-first-out (FIFO) buffer. If PIO is done is done via a direct connection to the I/O device through an I/O bus, then the prefetch cache coherency is sufficient to ensure that DMA read data from a cache hit is correctly ordered relative to PIO writes. Conversely, if a posted write FIFO is used, PIO writes are delayed in the posted write FIFO before they are written to the I/O bus. This delay can result in a read-write ordering violation.

This vulnerability to ordering violations is best illustrated by way of example. Consider a CPU that performs two writes A and B in that order. Write A is a PIO write to a device on an I/O bus. Write B modifies a location in memory. Because write A will be posted in the posted write FIFO, there will be some delay before the write is carried forward to the I/O bus. Write B, however, becomes effective immediately and is therefore visible to any I/O device reading that memory location. Therefore, if the I/O device that was written to by write A should read the memory location written to by write B while write A is still in the posted write FIFO, the effect of write B (i.e., the change in the memory value) will be visible to the I/O device before the effect of write A. Thus, an ordering violation will be incurred.

Accordingly, what is sought is a producer-consumer ordering system in which DMA reads instigated by a consumer agent are ordered relative to PIO writes that are instigated by a producer agent. Moreover, this ordering should be guaranteed even if the writes are to a mixture of different targets on different buses.

SUMMARY OF THE INVENTION

Certain objects, advantages, and novel features of the invention will be set forth in the description that follows and will become apparent to those skilled in the art upon examination of the following or may be learned with the practice of the invention.

To achieve the advantages and novel features, the present invention is generally directed to a bus bridge that provides an interface between two computer buses and guarantees the proper ordering of write operations mastered from one bus relative to read operations mastered from the other bus where the presence of write posting storage in the bus bridge could cause ordering violations. The bus bridge includes a first mechanism for counting the number of write operations that are received by the bus bridge and queued in the write posting storage. In addition, the bus bridge includes a second mechanism for counting the number of write operations completed on the second bus. A mechanism for measuring the age of data held in each cache line of a coherent cache is also included as part of the bus bridge. Finally, the bus bridge includes a mechanism for delaying the completion of a read operation from the cache until all writes that were accepted by the bus bridge on the first bus before the cache data was fetched have been completed on the second bus. This is determined by comparing the age of the data held in a cache line to be read with the difference between the number of write operations received by the bus bridge and the number of write operations that have completed on the second bus.

The present invention can also be viewed as providing a method for ordering write operations relative to read operations between two buses joined by a bus bridge. In this regard, the method can be broadly summarized by the following steps: Write posting storage is provided in the bus bridge that queues the write operations received from a first bus. Counts of both the number of write operations received in the write posting storage and the number of write operations completed on the second bus are maintained. The age of the data held in each cache line of a coherent cache is measured in units of the number of write operations received by the bus bridge since the data in the cache line was fetched. Finally, a read operation from the coherent cache is delayed from completion when any writes exist that were accepted by the bus bridge on the first bus before the cache data to be read was fetched and which have not been completed on the second bus.

An advantage of the present invention is that read operations from the cache are delayed for the minimum amount of time that is required to ensure that correct producer-consumer ordering is maintained.

Another advantage of the present invention is that it can be readily extended to a one-to-many bus bridge architecture with minimal or no modification to the two bus architecture and method.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

Figure 1:
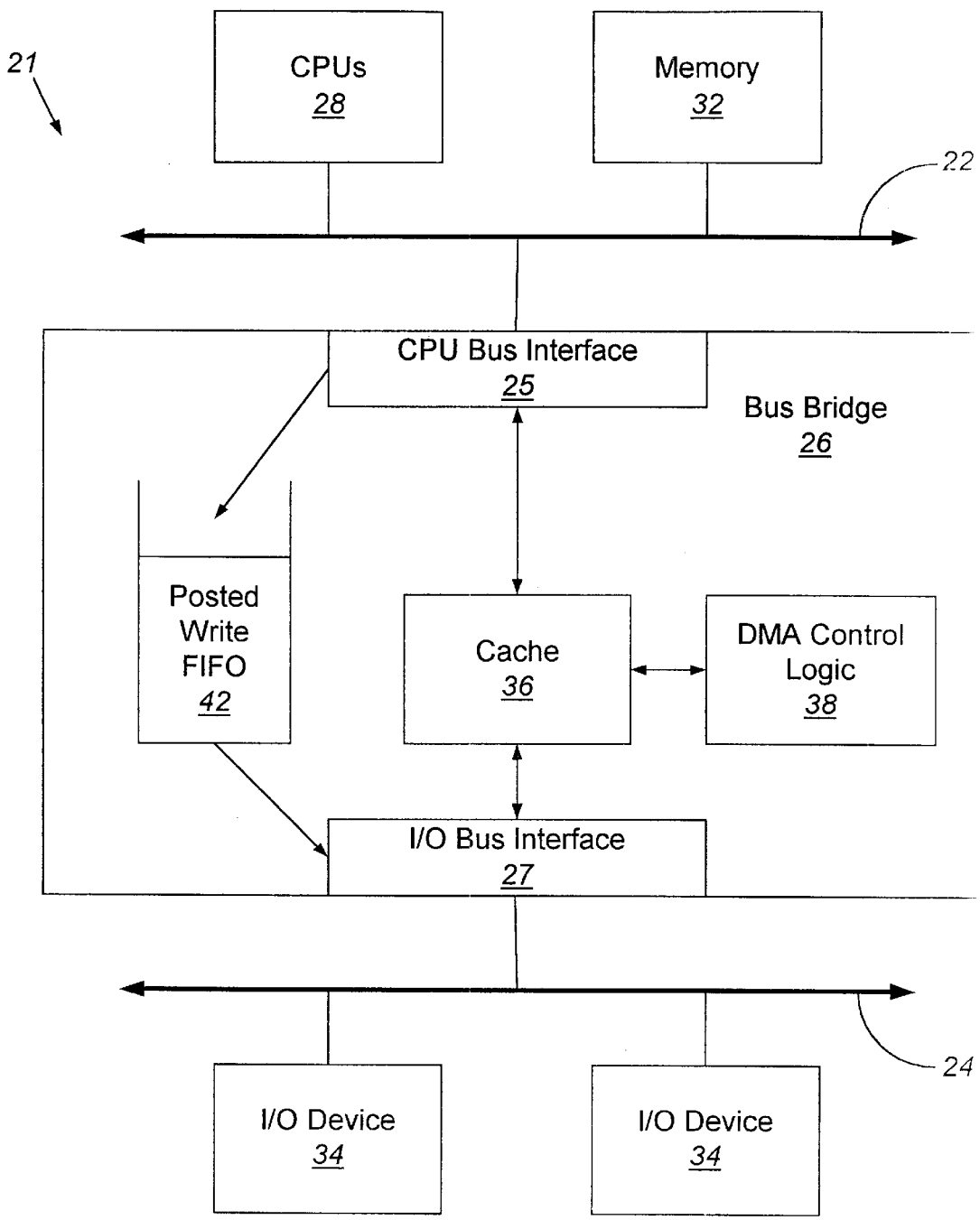
FIG. 1 is a block diagram that illustrates the architecture of a bus bridge for facilitating communication between a processor/memory bus and an I/O bus.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

The principles of the present invention will be described herein with reference to a computer system including a simple processor bus to I/O bus bridge. This simple example is chosen because unambiguous terminology can be used to specify buses and transaction types. Referring now to FIG. 1, a computer system 21 includes a CPU/memory bus 22 and an I/O bus 24 that are connected by a bus bridge 26 using CPU bus interface 25 and I/O bus interface 27. One or more CPUs 28 communicate with memory 32 via processor/memory bus 22 while I/O bus 24 facilitates communication with I/O devices 34—34. To improve performance, bus bridge 26 includes a prefetch cache 36 to mask the latency incurred by I/O devices 34—34 in accessing memory 32. Bus bridge 26 further includes DMA control logic 38 to support cache 36 and ensure the coherency of the prefetched data (i.e., the data supplied to I/O devices 34—34 reflects the latest writes to memory 32). A posted write FIFO 42 receives and queues the write requests from CPUs 28 that are destined for an I/O device 34 on I/O bus 24.

It is helpful at this point to define the terminology used herein in describing the operation of computer system 21. All cycles originated by an I/O device 34 that read or write memory through bus bridge 26 are called DMA. And, all cycles originated by a CPU 28 that read or write an I/O device 34 through bus bridge 26 are called PIO. Through directional arrows, FIG. 1 reflects the flow of DMA traffic and PIO write traffic through bus bridge 26. PIO read traffic is not reflected in FIG. 1, as this type of traffic is not relevant to the present invention.

Computer system 21 is susceptible to producer-consumer ordering violations of the type discussed hereinbefore. Specifically, if a CPU 28 issues two writes—first, a PIO write to an I/O device 34 and second, a write to memory 32—the I/O device 34 that was written to may perform a DMA read of the location in memory 32 that was altered by the second write before the first write takes effect due to the delay imposed by posted write FIFO 42.

Several prior art solutions are available for ensuring that writes issued by CPUs 28 (i.e., producers) become visible to I/O devices 34—34 (i.e., consumers) in the same order that they are generated. A first possible solution is to guarantee that posted write FIFO 42 is empty at the moment a DMA read is completed. This process can be accomplished by implementing a state machine that imposes a flow control on all PIO writes between the time a DMA read is first accepted until the posted write FIFO 42 is empty. Once FIFO 42 empties, the DMA read is allowed to complete.

DMA read operations are frequently split into two separate transactions: an initial DMA read request and the completion of the DMA read on the I/O bus 24. To ensure proper ordering of split DMA reads with PIO write transactions, the ordering system needs the capability of delaying completion of the DMA reads while one or more PIO writes from the posted write FIFO 42 are allowed to complete on the I/O bus 24.

Unfortunately, two performance problems result from emptying posted write FIFO 42 before completing a DMA read: First, if DMA reads are a frequent occurrence in computer system 21, then flow control of PIO writes will also be a frequent occurrence. As a result, the benefits of using a posted write FIFO 42 will be partially or totally eliminated. Second, DMA read performance is also impaired because the read cycle will be delayed from completion whenever posted write FIFO 42 is non-empty even if no ordering violation would have occurred. That is, when the memory location being read was not modified by a CPU 28 to memory 32 write that was issued after a PIO write to the I/O device requesting the DMA read was issued.

A second prior art solution is to force all DMA read data from the prefetch cache 36 to pass through the posted write FIFO 42. In this approach, DMA read data would be queued in posted write FIFO 42 behind any PIO writes that preceded the DMA read. While correct producer-consumer ordering is guaranteed, several disadvantages become apparent. First, DMA read completion is always delayed whenever PIO writes are outstanding, irrespective of whether the DMA read data has been modified since the PIO writes were issued. Second, posted write FIFO 42 must be larger as space is unnecessarily consumed by DMA read data in many instances. This increases the cost of bus bridge 26. Third, under certain circumstances it is desirable to be able to flush the DMA read data from posted write FIFO 42 without disturbing the PIO write entries. One such circumstance would be when speculatively prefetched data was being burst through the posted write FIFO 42 to efficiently utilize the I/O bus 24, but the I/O device 34 disconnected the burst. Here, complex control logic would be needed to selectively flush the non-contiguous DMA read data from posted write FIFO 42. This control logic, however, would increase the cost and complexity of bus bridge 26.

Another variation of the foregoing approach in which DMA read data is routed through posted write FIFO 42 is to send a single token through posted write FIFO 42 that represents the head of each burst of DMA read data. The DMA read data would still be accessed through cache 36; however, a state machine would hold the DMA read request in abeyance until the token associated with the read request has passed through posted write FIFO 42. This approach suffers from the same disadvantages as the previous approach with the exception that it is not as wastefull of space in posted write FIFO 42.

Figure 2:
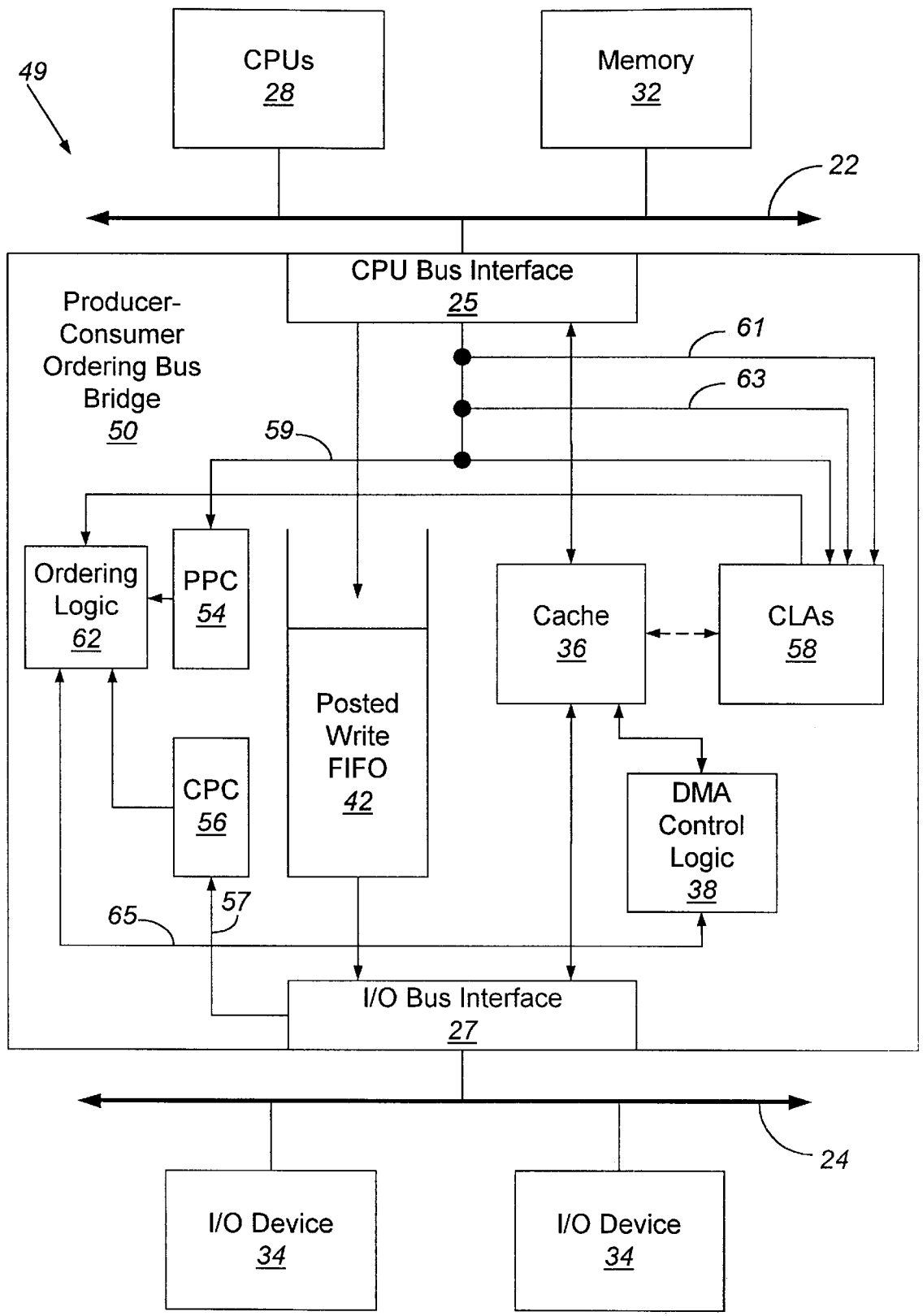
FIG. 2 is a block diagram of the bus bridge of FIG. 1 modified in accordance with the principles of the present invention to guarantee correct producer-consumer ordering of PIO writes mastered by the processor/memory bus relative to DMA reads mastered by the I/O bus.

With reference to FIG. 2, a computer system 49 embodying the principles of the present invention is shown that is more selective about when to delay completion of DMA reads. In particular, a DMA read completion will only be delayed if there is at least one outstanding PIO write and the cache line being read has been fetched from memory 32 since the oldest outstanding PIO write has issued. Advantageously, the DMA read completion is delayed for the minimum amount of time that is required to ensure that correct producer-consumer ordering is maintained.

Referring now to FIG. 2, computer system 49 includes the components comprising computer system 21 as shown in FIG. 1, but further includes a modified producer-consumer ordering bus bridge 50 having four additional components: 1) a producer PIO write counter (PPC) 54, 2) a consumer PIO write counter (CPC) 56, 3) cache line agers (CLA) 58, and 4) ordering logic 62.

PPC 54 is a counter that counts the number of PIO writes accepted by bus bridge 50 for forwarding to the I/O bus 24 using a modulus M. CPC 56 is a counter that counts the number of PIO writes completed on the I/O bus 24 using the same modulus M. The I/O bus interface 27 generates an increment signal on line 57 when PIO writes complete on I/O bus 24. CLAs 58 are counters that use the same number of bits as the PPC 54 and the CPC 56 but is not a modulo counter. Instead, CLAs 58 are designed to count up to a maximum value where they will remain until reset to zero. There is one CLA 58 for each cache line in prefetch cache 36, which is represented by the dashed arrow connecting the CLAs with the cache 36. The CLAs 58 are synchronized to increment in concert with the PPC 54 (i.e., each time a PIO write is accepted by bus bridge 50). Thus, the CLAs 58 and PPC 54 share a common increment signal line 59 that is driven from the CPU bus interface 25, which asserts an increment signal whenever a PIO write is accepted by bus bridge 50. A CLA 58 is reset to zero each time data is fetched via the CPU bus/memory bus 22 for its associated cache line through reset signal line 61 and reset select signal line 63, which are both driven from CPU/memory bus 22 through CPU bus interface 25. Reset select signal line 63 is used to select only that CLA 58 whose associated cache line has been fetched or re-fetched for reset to zero through reset signal line 6 1.

To summarize, a CLA 58 measures the age of the data held in an associated cache line in units of elapsed PIO write acceptances. Ordering logic 62 comprises hardware logic used to determine whether a given DMA read is allowed to proceed immediately or whether the DMA read must be delayed to allow further PIO write completions on the I/O bus 24. Ordering logic uses the values of counters PPC 54, CPC 56, and the CLAs 58 on an individual basis in making this determination. Accordingly, ordering logic 62 and DMA control logic 38 are in bi-directional communication with one another over signaling lines 65. Both the CLAs 58 and the PPC 54 are associated with the producer side of the bus bridge 50 (i.e., acceptance of PIO on CPU/memory bus 22) and the CPC 56 is associated with the consumer side of the bus bridge 50 (i.e., completion of PIO on I/O bus 24). It should be understood that, in general, the producer (e.g., CPUs 28 and CPU/memory bus 22) is not necessarily co-located with the consumer (e.g., I/O devices 34 and I/O bus 24). Moreover, the producer and consumer buses are not necessarily synchronous with respect to each other.

At any moment in time, the number of outstanding PIO writes (i.e., writes that have been accepted by bus bridge 50 but not completed on the I/O bus 24) is given by ((PFC−CPC) modulo A), where PPC and CPC are the values of the respective counters. The modulus M is chosen to be at least one greater than the greatest possible number of outstanding PIO writes, which is limited by the available space in posted write FIFO 42. Typically, modulus M will be rounded up to a power of two for implementation convenience.

If the CPU/memory bus 22, I/O bus 24, and prefetch cache 36 all share a single clock, there is no synchronization requirement. In this case, ordering logic 62 can use the values of the PPC 54, CPC 56, and CLA 58 counters directly in determining whether to delay completion of a DMA read or whether to let a DMA read complete immediately.

Alternatively, if the I/O bus 24 runs asynchronously to prefetch cache 36, there must be some mechanism for providing ordering logic 62 with the up-to-date value of CPC counter 56. If the I/O bus 24 uses deferred DMA reads in which the I/O bus 24 upon receiving a retry response from bus bridge 50 periodically re-attempts the DMA read until data are returned, each DMA read request should be accompanied by a field containing the value of the CPC 56 at the time of the DMA read request. This value of the CPC counter 56 is used by ordering logic 62 in determining when to complete the DMA read. In a deferred read system, the DMA read requests are typically made to the cache via a synchronizing resource, such as a clock domain crossing FIFO.

On the other hand, the I/O bus 24 may use split DMA reads. A DMA read is split when the DMA read request is a separate I/O bus 24 transaction from the DMA read completion and the completion transaction is mastered on the I/O bus 24 by the agent that was the target of the read request. For example, the DMA read request would be mastered by the I/O bus 24 while the DMA read completion would be mastered by the bus bridge 50. In a split DMA read system, I/O bus 24 should notify ordering logic 62, which controls read completions to prefetch cache 36, whenever the value of CPC counter 56 changes. This notification should be done through a synchronizing resource, such as a clock domain crossing FIFO.

Figure 3:
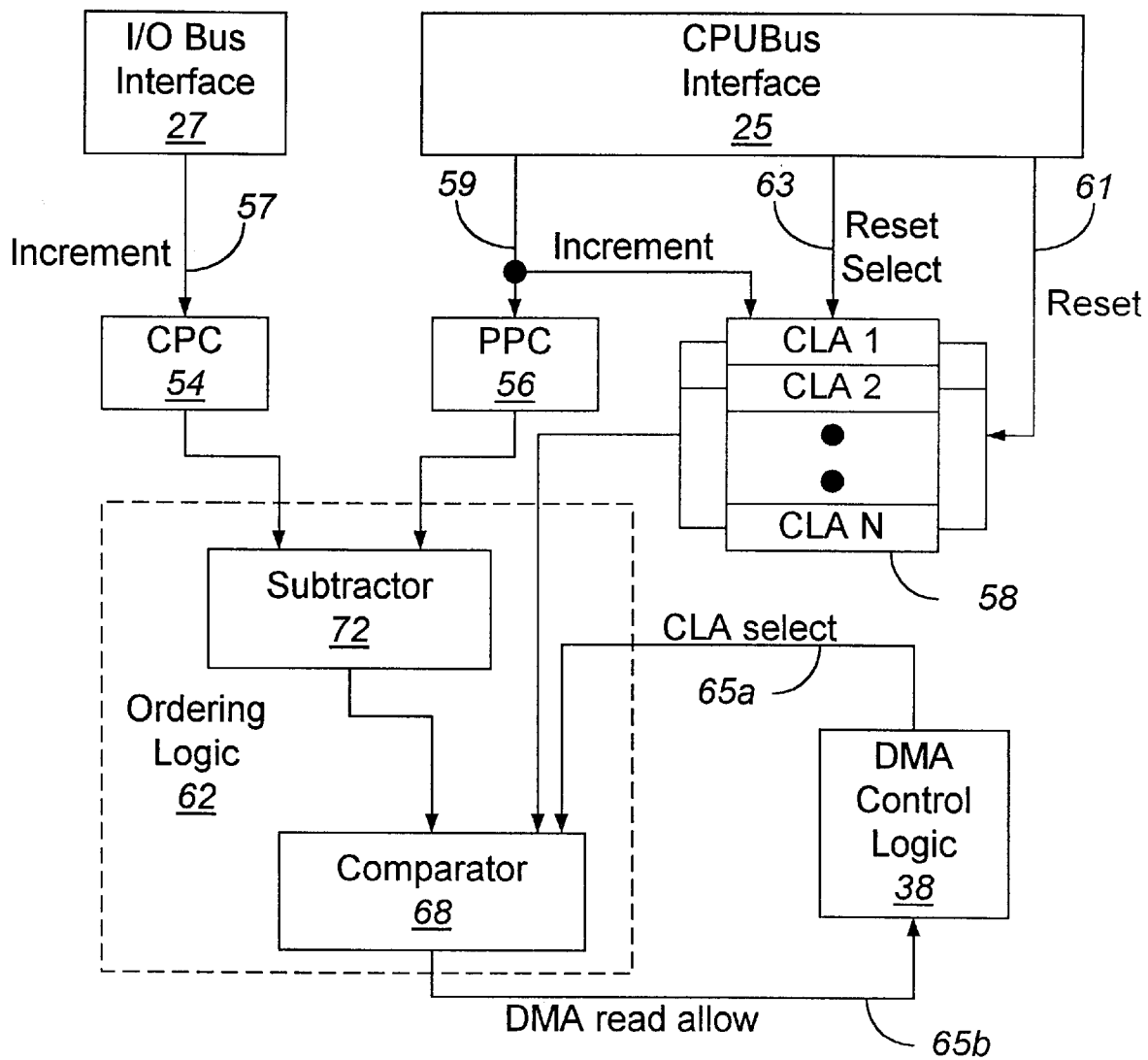
FIG. 3 is a more detailed block diagram of the hardware components of FIG. 2 used to implement the producer-consumer ordering algorithm according to the present invention.

The operation of bus bridge 50 to ensure proper producer-consumer ordering in computer system 49 is described hereafter with reference to the detailed block diagram of FIG. 3, illustrating the hardware components of FIG. 2.

Referring, now to FIGS. 2 and 3 a DMA read operation is initiated by an I/O device 34 by submitting a DMA read request to I/O bus 24. The DMA read request is received by bus bridge 50 through I/O bus interface 27. DMA control logic 38 selects the CLA 58 through CLA select line 65*a* that is associated with the cache line that is the target of the DMA read request and provides this value to ordering logic 62 generally and comparator 68 in particular. The CLA 58 value represents the number of PIO writes that have been accepted by the bus bridge 50 since its associated cache line was fetched. The values of the CPC 54 and PPC 56 counters are provided as inputs to subtractor 72, which calculates the difference between the PPC counter 54 and the CPC counter 56 using modulo M arithmetic. The number given by ((PPC−CPC) modulo M) represents the number of PIO writes currently outstanding. That is, PIO writes that have been accepted by bus bridge 50 but have not completed on I/O bus 24. The output of subtractor 72 is provided to comparator 68 where a determination is made whether the value of the CLA 58 counter is less than the number of PIO writes currently outstanding. If (CLA<(PPC−CPC)) modulo M), then one or more PIO writes that had already been accepted by the bus bridge 50 at the time the cache data was fetched have not yet completed on the I/O bus 24. This is a potential ordering violation.

To ensure no ordering violation occurs, ordering logic 62 based on the output of comparator 68 transmits a signal on DMA read allow line 65*b* to DMA control logic 38 to delay the completion of the DMA read until at least one more PIO write completes on the I/O bus 24. If deferred DMA reads are being used, a retry must be issued to free up the I/O bus 24 to complete more PIO writes. If split DMA reads are being used, the read return must be delayed until at least one more PIO write completes. After one or more PIO writes complete on I/O bus 24, the ordering logic 62 repeats the computation with the incremented CPC counter 56 value.

When ordering logic 62 determines through comparator 68 that the number of PIO writes that that have been accepted by the bus bridge 50 since the cache line was fetched (i.e., CLA 58 counter value) is greater than or equal to the number of PIO writes that are currently outstanding, the DMA read is allowed to complete by ordering logic 62 through transmission of an allowance signal on DMA read allow line 65*b*. In this case, the data contained in the cache line is older than any uncompleted PIO writes that could have been issued prior to the time the cache line was fetched.

A PIO write operation is initiated by a CPU 28 submitting a PIO write request to CPU/memory bus 22. The PIO write request is received by bus bridge 50 through CPU bus interface 25. Once the bus bridge 50 accepts the PIO write request, the PPC counter 54 is incremented using modulo M arithmetic and the CLA counters 58 for all of the cache lines in cache 36 are incremented in concert with each other through increment signal line 59. The logic for each CLA counter 58 is designed to determine whether the counter has exceeded the modulus M. If the modulus M has been exceeded, the CLA counter 58 is limited to a value equal to the modulus M. Once a CLA counter 58 counts up to the value M, the data in the cache line is so old that all PIO writes that were in-flight at the time the data was fetched must already have completed on the I/O bus 24. Because M was chosen to be at least one greater than the highest possible number of outstanding PIO writes, there is not enough posted write FIFO 42 storage for any of the PIO writes that were in-flight at the time the data was fetched to still be in flight. Whenever a PIO write from posted write FIFO 42 completes on I/O bus 24, the CPC counter 56 is incremented via increment signal line 57 using modulo M.

The present invention allows each DMA read to complete once all the PIO writes that were in-flight at the time the cache line to be read was fetched have completed on the I/O bus 24. One factor that could inhibit forward progress of DMA reads is snoops from the CPU/memory bus 22 side of the cache 36 or least recently used (LRU) purges of sections of the cache 36 memory. For example, LRU selected purges could require the cache line to be repeatedly re-fetched even if the data has not been changed. Each re-fetch will cause the CLA counter 58 associated with the cache line to be reset to zero. Similarly, forward progress could be arrested by a CPU 28 alternating between writes to memory 32 and PIO writes. Each memory 32 write snoops the cache line, which results in the cache line being re-fetched with the CLA counter 58 associated with the cache line being reset to zero. Thus, before a DMA read can complete, the immediately preceding PIO write must complete on the I/O bus 24.

The present invention is compatible with forward progress protocols typically used for cache memory systems. First, LRU selected purges are generally addressed by applying a lock to the first cache line of each DMA read burst, thereby exempting it from consideration from LRU selected purges until it has been used to provide a read return value.

Second, consider the case of snoop invalidation. Instead of purging the cache line due to a snoop, the cache line transitions into a non-coherent snapshot state. Whenever a cache line fetched for a DMA read is in the locked state as discussed in the foregoing, a snoop invalidate will not result in the cache line being purged. Instead, the cache line drops out of participation in snoops from the CPU/memory bus 22 side of the cache 36 and is not purged until it is used to supply the data for the DMA read return. The data, however, is immediately purged upon completion of the DMA read return.

It should be recognized that inasmuch as the data from the cache line in the non-coherent snapshot state is not included in the coherency protocol for cache 36, it is not suitable for general use. Nevertheless, the data in the non-coherent snapshot state can be used to complete the DMA read that initially caused the data to be fetched because the cache 36 was coherent at the time of the read request.

The present invention has been described herein as applied to a single CPU/memory bus 22 to I/O bus 24 bridge. It is envisioned that the invention could be applied in a one-to-many bus bridge environment. That is, several I/O buses 24 could be bridged to a single CPU/memory bus 22 using a bus bridge 50.

The one-to-many bus bridge can be implemented in a variety of configurations. First, if each I/O bus 24 has its own independent cache 36, the present invention can simply be duplicated for each of the I/O buses 24. That is, each I/O bus 24 would have a set of PPC 54, CPC 56, and CLA 58 counters and ordering logic 62 assigned to it, which would operate independently as described in the foregoing.

Alternatively, if a single cache 36 is used for all I/O buses 24 two approaches can be followed: using a single CLA 58 per cache line or using multiple CLAs 58 per cache line.

The most straightforward configuration is to assign a single CLA 58 counter to each cache line for each I/O bus 24. Each I/O bus 24 includes a set of PPC 54, and CPC 56 counters and ordering logic 62. Whenever cache line data is fetched, all the CLAs 58 associated with that cache line are reset to zero. Whenever a PIO write is accepted by the bus bridge 50, the PPC counter 54 for that particular I/O bus 24 increments along with the CLAs 58 corresponding to the destination I/O bus for each cache line. Whenever a determination is made whether to allow a DMA read to complete, the test is applied using the I/O bus 24 specific CLA 58 associated with the cache line that was hit and the PPC 54 and CPC 56 counters associated with the particular I/O bus 24.

Finally, if a single cache 36 is shared between multiple I/O buses 24, each cache line can use a single CLA counter 58 rather than one CLA counter 58 per I/O bus 24. In this configuration, whenever cache line data is fetched, the associated CLA counter 58 is reset to zero and the cache line is bound to a particular I/O bus 24. Thus, all cache lines are bound to some I/O bus 24 as an initial fetch of data for a DMA read will cause the cache line to be bound to the I/O bus 24 that initiated the read operation. The CLA counter 58 is incremented only for PIO writes targeted to the I/O bus 24 to which the cache line is bound. Therefore, additional logic is included to filter increment line 59 such that only those CLAs 58 bound to the I/O bus 24 that is targeted by the current PIO write are incremented. DMA read requests from other I/O buses 24 that hit a cache line in the lock state or in the non-coherent snapshot state are held in abeyance until the cache line exits that state. Once the cache line exits the lock state or non-coherent snapshot state it is re-bound to the I/O bus 24 that initiated the DMA read. Note, however, that once a cache line exits the non-coherent snapshot state it will be immediately purged and new data will be fetched from memory 32. DMA read requests from other I/O buses 24 that hit a cache line not in either the lock state or in the non-coherent snapshot state will result in that cache line being re-bound the I/O bus initiating the DMA read request.

The process of binding involves re-setting the CLA counter 58 to zero and delaying the DMA read completion using the process described hereinbefore. Effectively, PIO writes in flight at the time of the binding are conservatively assumed to have been outstanding longer than the age of the cache line data. To guarantee forward progress, lines in the locked and non-coherent snapshot states cannot be re-bound until they are released as discussed in the foregoing.

In concluding the detailed description, it should be noted that it will be obvious to those skilled in the art that many variations and modifications can be made to the preferred embodiment without substantially departing from the principles of the present invention. For example, the invention has been described herein as embodied in a bus bridge for facilitating communication between a processor/memory bus and one or more I/O buses. The invention is applicable, however, to any architecture in which there is write posting storage for writes mastered from one side of the bridge and a cache or other coherent prefetch resource serving read cycles mastered from the other side of the bridge. All such variations and modifications are intended to be included herein within the scope of the present invention, as set forth in the following claims.

We claim:

1. A bus bridge for ordering write operations mastered from a first bus and destined to a second bus relative to read operations mastered from the second bus and destined for completion on the second bus by way of a coherent cache in said bus bridge, said bus bridge comprising:

first means for queueing the write operations from the first bus;

second means for counting a number of write operations received in said first means for queueing;

third means for counting a number of write operations completed on the second bus;

fourth means for measuring an age of data held in a cache line in the coherent cache in units of write operations received in said first means for queueing since said data in said cache line was fetched; and fifth means for delaying completion of said read operations when said age of said data to be read from the coherent cache is less than a difference between said number of write operations received in said first means for queueing and said number of write operations completed on the second bus.

2. The bus bridge of claim 1, further comprising:

sixth means for setting said age of said data held in said cache line in the coherent cache to zero each time said data is fetched.

3. The bus bridge of claim 1, wherein said second means for counting and said third means for counting use a modulus M in generating counts.

4. The bus bridge of claim 3, wherein said modulus M is greater than a maximum number of write operations that can be queued in said first means for queueing.

5. The bus bridge of claim 3, wherein said age of said data held in said cache line in the coherent cache is limited to a maximum value equal to said modulus M.

6. The bus bridge of claim 1, further comprising:

sixth means for locking said data held in said cache line in the coherent cache upon an attempt by one of said read operations to read said data in said cache line such that said locked data is not purged from said cache line until said read operation completes.

7. A method for ordering write operations relative to read operations between first and second buses joined by a bus bridge, the write operations being mastered from the first bus and destined to the second bus and the read operations being mastered from the second bus and destined for completion on the second bus by way of a coherent cache in the bus bridge, comprising the steps of:

(a) providing write posting storage for queueing the write operations from the first bus;

(b) counting a number of write operations received in said write posting storage;

(c) counting a number of write operations completed on the second bus;

(d) measuring an age of data held in a cache line in the coherent cache in units of write operations received in said write posting storage since said data in said cache line was fetched; and (e) delaying completion of said read operations when said age of said data to be read from the coherent cache is less than a difference between said number of write operations received in said write posting storage and said number of write operations completed on the second bus.

8. The method of claim 7, further comprising the step of:

(f) setting said age of said data held in said cache line in the coherent cache to zero each time said data is fetched.

9. The method of claim 7, wherein a modulus M is used in generating counts in steps (b) and (c).

10. The method of claim 9, wherein said modulus M is greater than a maximum number of write operations that can be queued in said write posting storage.

11. The method of claim 9, wherein said age of said data held in said cache line in the coherent cache is limited to a maximum value equal to said modulus M.

12. The method of claim 7, further comprising the step of:

(f) locking said data held in said cache line in the coherent cache upon an attempt by one of said read operations to read said data in said cache line such that said locked data is not purged from said cache line until said read operation completes.

13. A bus bridge for ordering write operations mastered from a first bus and destined to a second bus relative to read operations mastered from the second bus and destined for completion on the second bus by way of a coherent cache in said bus bridge, said bus bridge comprising:

write posting storage for queueing the write operations from the first bus;

a producer write counter for counting a number of write operations received in said write posting storage;

a consumer write counter for counting a number of write operations completed on the second bus;

a cache line ager counter for measuring an age of data held in a cache line in the coherent cache in units of write operations received in said write posting storage since said data in said cache line was fetched; and ordering logic for delaying completion of said read operations when said age of said data to be read from the coherent cache is less than a difference between said number of write operations received in said write posting storage and said number of write operations completed on the second bus.

14. The bus bridge of claim 13, further comprising:

a reset signal line in communication with said first bus and said cache line ager counter for re-setting said cache line ager counter to zero each time said data is fetched.

15. The bus bridge of claim 13, wherein said producer write counter and said consumer write counter use a modulus M in generating counts.

16. The bus bridge of claim 15, wherein said modulus M is greater than a maximum number of write operations that can be queued in said write posting storage.

17. The bus bridge of claim 15, wherein said age of said data held in said cache line in the coherent cache is limited to a maximum value equal to said modulus M.

18. The bus bridge of claim 13, wherein said ordering logic comprises:

a subtractor that receives count values from said producer write counter and said consumer write counter and produces an output corresponding to the difference between said count values of said producer write counter and said consumer write counter using modulo M arithmetic; and a comparator that receives said output of said subtractor as a first input and a count value of said cache line ager as a second input, said comparator generating an output signal for delaying completion of said read operations.

* * * * *